United States Patent [19]
Tajima

[11] Patent Number: 4,833,206

[45] Date of Patent: May 23, 1989

[54] SANITARY RUBBER COMPOSITION OR ARTICLE

[75] Inventor: Masao Tajima, Katushika, Japan

[73] Assignee: Kabushiki Kaisha Toritsu Industry, Tokyo, Japan

[21] Appl. No.: 172,966

[22] Filed: Mar. 29, 1988

Related U.S. Application Data

[63] Continuation of Ser. No. 833,713, Feb. 27, 1986, abandoned.

[51] Int. Cl.$^4$ .................. C08L 23/04; C08L 9/00
[52] U.S. Cl. .................... 525/187; 525/210; 525/222; 525/232; 525/240
[58] Field of Search ............ 525/232, 210, 222, 240, 525/187; 428/327

[56] References Cited

U.S. PATENT DOCUMENTS

| | | | |
|---|---|---|---|
| 28,688 | 1/1876 | Cook | 525/177 |
| 3,883,145 | 5/1975 | Cox et al. | 525/232 |
| 3,911,051 | 10/1975 | Schouten et al. | 525/194 |
| 4,130,534 | 12/1978 | Coran et al. | 525/232 |
| 4,183,876 | 1/1980 | Coran et al. | 525/232 |
| 4,311,628 | 1/1982 | Abdov-Sabet et al. | 525/232 |
| 4,348,266 | 9/1982 | Coran et al. | 525/232 |

*Primary Examiner*—Herbert J. Lilling
*Attorney, Agent, or Firm*—Wenderoth, Lind & Ponack

[57] ABSTRACT

A sanitary rubber composition or article comprising a synthetic rubber prepared by solution polymerization and a fine powder of polyethylene having a molecular weight of $1 \times 10^6$ to $1 \times 10^9$ and having excellent chemical and physical properties is described.

1 Claim, No Drawings

SANITARY RUBBER COMPOSITION OR ARTICLE

This application is a continuation of application Ser. No. 833,713, filed Feb. 27, 1986, now abandoned.

BACKGROUND OF THE INVENTION

1. Field of the Invention

This invention relates to sanitary rubber compositions or articles having excellent chemical and physical properties and more particularly, it is concerned with a sanitary rubber composition or article comprising a rubber blended with a finely divided polyethylene powder of a super-high molecular weight. By the sanitary rubber composition or article, we mean rubber articles in contact with foods, rubber closures or plugs for pharmaceutical vessels, rubber products attached to medical instruments, rubber articles used for human bodies and animals and the like, which have some influences upon human bodies and animals directly or indirectly and which are different from industrial rubber articles, tires and foot wears in chemical and physical properties. That is to say, the sanitary rubber article of the present invention includes rubber articles for foods, drugs, cosmetics, veterinary medicines, feeds and radiation protection, which comes under the administration of the Food and Drug Administration.

2. Description of the Prior Art

For rubber closures for drugs, for example, about 30 examination and test items must be satisfied. These items include provisions for solving problems such as the following: (1) if an additive used as an essential component for a synthetic rubber is released from the surface of a product, it becomes added to a medical fluid as fine particles, (2) when a rubber closure of a vial is pierced by an injection needle, rubber pieces are broken off and added to a medical fluid and (3) if an opening is formed when the injection needle pierces the rubber closure, a medical fluid may issue and spoil clothes. Thus, sanitary rubber articles must be prepared so as to satisfy these newly added requirements.

Up to the present time, it has been proposed to add low molecular weight polyethlene to various rubbers (Japanese Patent Publication No. 5973/1960, Canadian Pat. No. 846831/1962) and to produce a rubber plug for an injection fluid by blending a natural rubber or synthetic rubber with a fine powder of polyethylene (Japanese Patent Publication No. 8789/1970). In these techniques, however, a fine powder of polyethlene should be used in a proportion of 1 to 10% by weight with carbon black and lithopone (ZnS+BaSO$_4$) as a reinforcing agent, since the bridging efficiency is low and the physical properties of a bridged product are inferior.

SUMMARY OF THE INVENTION

It is an object of the present invention to provide a sanitary rubber composition or article capable of satisfying the quality standard.

It is another object of the present invention to provide a rubber closure for an injection, having excellent chemical and physical properties.

It is a further object of the present invention to provide a rubber composition for a sanitary article, containing no inorganic filler or reinforcing agent.

These objects can be attained by a rubber composition for a sanitary article comprising a synthetic rubber and a fine powder of polyethylene with a mean molecular weight of 1,000,000 to 1,000,000,000.

DETAILED DESCRIPTION OF THE INVENTION

The inventor has made various efforts over a long time and consequently, has found that a sanitary rubber article which can favorably be compared with rubber articles of the prior art using ordinary additives is obtained by mixing a synthetic rubber prepared by solution polymerization with a fine powder of polyethylene having a mean molecular weight of $1 \times 10^6$ to $1 \times 10^9$, bridging with a bridging agent and forming.

Accordingly, the present invention provides a rubber composition for a sanitary article, comprising a synthetic rubber, particularly prepared by solution polymerization, and a finely divided powder of polyethylene having a mean molecular weight of $1 \times 10^6$ to $1 \times 10^9$ (hereinafter referred to as HMWPE) and a sanitary rubber article such as rubber closure for an injection fluid, comprising a blend of a synthetic rubber and HMWPE, which has been bridged and shaped.

That is to say, in the present invention, sanitary rubber articles, for example, rubber closures for injectable products such as wads, plugs with or without a skirt or flange and caps, having excellent physical properties (tensile strength, elongation, etc.) and sanitary properties (KMnO$_4$ consumption, ultraviolet absorption spectrum, etc. of the extraction solution) can be obtained by adding only HMWPE to a synthetic rubber prepared by solution polymerization, followed by bridging and shaping. Generally, HMWPE is added in a proportion of 3 to 50 parts by weight to 100 parts by weight of a synthetic rubber.

However, because there are a number of kinds of sanitary rubber products and a number of requirements to be satisfied, addition of only HMWPE is sometimes insufficient. In such cases, other additives such as silicon oxide, aluminum silicates, magnesium silicates, clays and titanium oxides can be added in a proportion of 1 to 30 parts by weight to 100 parts by weight of a synthetic rubber for the purpose of improving the abrasion resistance, flexibility resistance and compression set. If the addition exceeds 30 parts by weight, the bridged rubber product is not suitable as a sanitary rubber article because of increase of the KMnO$_4$ consumption and residue on evaporation of the extraction solution.

When the quantity of HMWPE is more than 50 parts by weight, the bridged rubber product is not suitable as a sanitary rubber article because of the higher hardness, the resinous properties in the quantity of strain and degree of crystallization and the lower visoelasticity at a high temperature. HMWPE is a polyethylene, for example, prepared by polymerizing ethylene gas at a pressure of 0 to 7 atm in the presence of a Ziegler catalyst consisting of triethylaluminum and carbon tetrachloride in combination and the mean molecular weight is at least $1 \times 10^6$ as determined by the viscosity method or at least $3 \times 10^6$ as determined by the light scattering method, while an ordinary polyethylene (referred to as PE) has a molecular weight of $2$–$10 \times 10^4$ as determined by the viscosity method or $6$–$30 \times 10^4$ as determined by the light scattering method.

Comparison of the properties of HMWPE and PE is tabulated below:

| Properties | HMWPE | PE | Test Method |
|---|---|---|---|
| Density (g/cc) | 0.93–0.94 | 0.92–0.94 | ASTM D 1505 |
| Tensile Strength at Breaking Point (kg/cm$^2$) | 400–440 | 90–170 | ASTM D 638 |
| Elongation at Breaking Point | 350–400 | 150–750 | ASTM D 638 |
| Melting Point(°C). | 136 | 105–118 | ASTM D 2117 |
| Vicat Softening Point (°C.) | 134 | 76–115 | ASTM D 1525 |
| Thermal Deformation Temperature (°C.) | 85 | — | ASTM D 648 |

Preparation of a finely divided powder of HMWPE is carried out by mechanically crushing pellets of high molecular weight polyethylene in the air or water, by dissolving it in a hot solvent such as carbon tetrachloride or trichloroethylene and then cooling rapidly or mixing it with water or alcohol to precipitate it in the form of fine particles.

Preferably, HMWPE having a particle size small enough to pass through a sieve of 74μ (200 mesh) is used, but the presence of large amounts of fine particles of less than 1μ is not desirable since scattering takes place due to electrification and dispersion in the rubber is prevented.

When small samples of HMWPE are viewed under an electron microscope, a number of cracks can be seen on the surfaces of the particles and a number of heteromorphic particles can be seen. Therefore, it is assumed that a synthetic rubber and HMWPE form a polymer network and thus HMWPE gives more excellent sanitary products than PE in respect of improving the abrasion resistance, impact strength, heat and deformation resistance, chemical and solvent resistance and safety property. In the present invention, accordingly, a sanitary rubber product can be produced without using inorganic reinforcing agents or fillers such as aluminum silicate, magnesium silicate and barium sulfate, and vulcanizing agents.

As the synthetic rubber of the present invention, the rubbers used can be prepared by solution polymerization, for example, isobutylene-isoprene rubber (IIR), chlorinated isobutylene-isoprene rubber (CIIR), brominated isobutylene-isoprene (BIIR), isobutylene-isoprene-divinylbenzene copolymer, ethylene-propylene rubber (EPM), ethylene-propylene-diene rubber (EPDM), chlorosulfonated polyethylene (CSM), epichlorohydrin rubber (CO, ECO, GCO, GECO), butadiene rubber (BR), isoprene rubber (IR), styrene-butadiene rubber (SBR), isoprene-styrene rubber (SIR) and ethylene-vinyl acetate copolymer (EAM). These rubbers can be used individually or in combination. Thermoplastic rubbers of styrene-butadiene or styrene-isoprene can also be used. Synthetic rubbers by emulsion polymerization and natural rubbers are not suitable for sanitary rubber articles due to the presence of emulsifiers and proteins, respectively.

Organic peroxides, which can be used as a vulcanizing agent in the present invention, are for example dicumyl peroxide, 1,4-di-(t-butylperoxyisopropyl)benzene, 2,5-dimethyl-2,5-di-(t-butylperoxy)hexane, 2,5-dimethyl-2,5-di-(t-butylperoxy)hexyne-3 and the like.

In addition, as another bridging agent, there are sulfur- or organosulfur-imparting vulcanizing agents and as a bridging aid, there are vulcanization accelarating agents, vulcanization activating agents, processing aids, vulcanization retarding agents and the like, typical of which are zinc white, stearic acid, magnesium oxide, tetramethyl-thiuram disulfide, tetraethylthiuram disulfide, dipentamethylene tetasulfide, zinc di-n-butyl-dithiocarba-mate, zinc diethyldithiocarbamate, N-cyclohexyl-2-benzo-thiazolylsulfenamide, N-t-butyl-2-benzothiazolyl-sulfenamide, tetramethylthiuram monosulfide, fatty acid esters and fluorine-containing lubricants. These agents are generally added in a proportion of 0.05 to 10 parts by weight to 100 parts by weight of a synthetic rubber.

Furthermore, organosilane compounds such as vinyltriethoxysilane, vinyltriacetylsilane, vinyl-tris (β-methoxyethoxy)silane, γ-methacryloxypropyltrimethoxysilane, γ-glycidoxypropyltrimethoxysilane, RTV silicone rubbers, silicone oils and the like can also be added in a proportion of 0.05 to 3 parts by weight to 100 parts by weight of a synthetic rubber.

The rubber composition of the present invention can be subjected to radiation vulcanization, for example, by the use of an electron beam.

As the sanitary rubber product or article of the present invention, for example, there are given rubber parts for rice cookers, sealants for water bottles or cans, rubber closures for vials of medicines or chemicals and medical devices such as parts of artificial kidneys, syringes, etc.

The following examples are given in order to illustrate the present invention in detail without limiting the same.

EXAMPLES

HMWPE (Hizex Million 240 M -commercial name- manufactured by Mitsui Sekiyu Kagaku Kogyo KK. molecular weight $=200\times 10^4$ as determined by viscosity method, grain size =capable of passing through a sieve of 105μ, melting point $=136°$ C.) was added to IIR (JSR Butyl 365-commercial name-, unsaturation degree $=2.0$ mol %, $ML_{1+4}(100°$ C.$)=45$) in proportions as shown in Table 1, mixed at a temperature of 80° to 120° C. in a pressure kneader (made by Moriyama Seisakujo KK), compounded with bridging systems as shown in Table 1 in a biaxial rubber roll according to ASTM D 3188 ('73) and then subjected to a test using an oscillating disk rheometer (hereinafter referred to as ODR) (made by Toyo Seiki Seisakujo KK) according to ASTM D-2705 ('67), thus obtaining results as shown in Table 2.

TABLE 1

| Components | Examples | | | Comparative Examples | | | |
|---|---|---|---|---|---|---|---|
| | 1 | 2 | 3 | 4 | 3 | 2 | 1 |
| IIR: JSR 365 | 100 | 100 | 100 | 100 | 100 | 100 | 100 |
| HMWPE | 43 | 20.5 | 5.3 | | | | |
| Polyethylene[1] | | | | | 5.3 | 20.5 | 43 |
| Zinc Oxide | 2 | 2 | 2 | 2 | 2 | 2 | 2 |
| Stearic Acid | 0.5 | 0.5 | 0.5 | 0.5 | 0.5 | 0.5 | 0.5 |
| Sulfur | 1 | 1 | 1 | 1 | 1 | 1 | 1 |
| Vulcanization Accelerator TRA[2] | 0.4 | 0.4 | 0.4 | 0.4 | 0.4 | 0.4 | 0.4 |
| BZ[3] | 0.7 | 0.7 | 0.7 | 0.7 | 0.7 | 0.7 | 0.7 |

Note:
[1]FLO-THENE UF -commercial name- manufactured by Seitetsu Kagaku KK, grain size = capable of passing through a sieve of ASTM No. 80, melting point = 103–111° C., high density
[2]dipentamethylene thiuram hexasulfide
[3]zinc di-n-butyl dithiocarbamate

TABLE 2

| ODR Test (temp 160° C., amplitude angle 3°) | | | | | | | |
|---|---|---|---|---|---|---|---|
| | Examples | | | Comparative Examples | | | |
| | 1 | 2 | 3 | 4 | 3 | 2 | 1 |
| Torque (kg/cm) | | | | | | | |
| Initial (a) | 32.0 | 26.2 | 22.0 | 20.1 | 22.4 | 30.8 | 38.3 |
| Minimum (b) | 24.5 | 20.5 | 16.4 | 15.8 | 14.8 | 12.3 | 11.2 |
| Maximum (c) | 48.5 | 44.0 | 38.5 | 36.7 | 33.6 | 27.6 | 22.3 |
| (c)-(b) | 24.0 | 23.5 | 22.1 | 20.9 | 18.8 | 15.3 | 11.1 |
| Cure Time (minute) | | | | | | | |
| tc (10) | 2.9 | 2.9 | 2.9 | 2.9 | 2.9 | 3.0 | 3.1 |
| tc (90) | 8.6 | 8.7 | 8.9 | 9.9 | 9.8 | 9.9 | 9.9 |
| tc (90)-(10) | 5.7 | 5.8 | 6.0 | 7.0 | 6.9 | 6.9 | 6.8 |

As apparent from these results, HMWPE is capable of increasing the torque, while PE decreases the torque, the difference increasing with the larger the quantity of HMWPE. PE acts as a softening agent and as an agent that hinders the vulcanization action of IIR.

TABLE 3

| Physical Properties of Vulcanizates[1] | | | | | | | |
|---|---|---|---|---|---|---|---|
| | Examples | | | Comparative Examples | | | |
| | 1 | 2 | 3 | 4 | 3 | 2 | 1 |
| Hardness (Hs) | 59 | 45 | 34 | 30 | 36 | 59 | 76 |
| 300% Modulus (kg/cm$^2$) | 36 | 20 | 13 | 10 | 9 | 15 | 20 |
| Tensile Strength (kg/cm$^2$) | 76 | 76 | 69 | 76 | 107 | 118 | 115 |
| Elongation at Break (%) | 460 | 500 | 750 | 800 | 830 | 820 | 800 |
| Permanent Set (%) | 2.7 | 2.0 | 3.2 | 3.4 | 5.9 | 29.6 | 65.6 |

Note:
[1]vulcanization temperature 160° C. × 30 minutes according to JIS K 6301 (1975)

The vulcanization was carried out according to SRIS-3603 and the test of the vulcanizates was carried out according to JIS K-6301 (1975).

A sanitation test was carried out by extracting a sample in water at 90° C. for 30 minutes and determining the residue on evaporation and the consumption of potassium permanganate according to JIS 9010 (1982).

TABLE 4

| Sanitation Test | | | | | | | |
|---|---|---|---|---|---|---|---|
| | Examples | | | Comparative Examples | | | |
| | 1 | 2 | 3 | 4 | 3 | 2 | 1 |
| Residue on Evaporation (ppm) | 3.2 | 4.2 | 6.1 | 8.3 | 12.6 | 23.2 | 36.8 |
| KMnO$_4$ Reducing Substance (ppm) | 4.6 | 5.2 | 6.3 | 7.8 | 9.6 | 12.8 | 15.6 |

As apparent from the results of Tables 3 and 4, HMWPE is capable of improving the modulus, permanent set, residue on evaporation and consumption of KMnO$_4$, while PE hinders the curing.

It can clearly be understood that HMWPE and PE have the similar physical properties, but show completely different performances when added to IIR and the like. For example, HMWPE and PE have the following physical properties in the form of films:

| | Tensile Strength (kg/cm$^2$) | Elongation at Break (%) |
|---|---|---|
| HMWPE | 236 | 690 |
| PE | 206 | 880 |

EXAMPLE 4

Using the following composition, mixing was carried out in an analogous manner to Examples 1-3:

TABLE 5

| CIIR (CHLORO BUTYL 1066[1]) | 100 parts by weight |
|---|---|
| HMWPE (HIFAX 1900[2]) | 28 |
| Zinc Oxide | 1 |
| Magnesium Oxide | 2 |
| Stearic Acid | 0.3 |
| Tetramethylthiuram Disulfide | 0.6 |
| Zinc Diethyldithiocarbamate | 0.6 |

Note:
[1]commercial name, manufactured by Exxon Chemical
[2]commercial name, manuactured by Hercules, mean molecular weight as determined by viscosity method = 700 × 10$^4$, density = 0.94, grain size = capable of passing through a sieve of ASTM No. 70, tensile strength of film = 239 kg/cm$^2$ Vulcanization of the compound was carried out by pressing at a temperature of 150° C. for 30 minutes according to JIS K 6301.

TABLE 6

| Physical Properties of Vulcanizates[1] | |
|---|---|
| Hardness (Hs) | 38 |
| 500% Modulus (kg/cm$^2$) | 32 |
| Tensile Strength (kg/cm$^2$) | 122 |
| Elongation at Break (%) | 760 |
| Permanent Set (%) | 3.8 |

Note:
[1]temperature 150° C. × 30 minutes according to JIS K 6301

The rubber sample was first washed with a dilute alkali (e.g. NaHCO$_3$) and then extracted with an amount of water 10 times the weight of the rubber at a temperature of 121° C. for 60 minutes according to the test method of rubber closures for aqueous infusions as specified in The Pharmacopoeia of Japan 41. The test results of the extracted liquid and the standard values of The pharmacopoeia of Japan are shown in Table 7:

TABLE 7

| Extraction Test | | |
|---|---|---|
| | Measured Value | Standard Value |
| Description (%) | 99.5 | 99.0 |
| Foam Test (min) | 2 | 3 |
| pH | 0.8 | ±1 |
| Zinc (μg/ml) | 0.01 | 0.5 |
| KMnO$_4$-reducing Substance (ml) | 0.8 | 2.0 |
| Residue on Evaporation (mg) | 0.8 | 2.0 |
| Ultraviolet Absorption Spectrum | 0.08 | 0.2 |

Specificity tests were also carried out as follows:
(1) Insoluble Particulate Matter Test 10 rubber closures are placed in a hard glass bottle to which 100 ml of dust-free water is added and which is shaked for 20 seconds, then allowed to stand for 1 hour and subjected to measurement 4 times using a light-shielded type automatic fine particle meter (PC-320, -commercial name- made by HIAC/Royco Co.). The initial data is discarded and a mean value is taken of the next three data.

(2) Determination of Fragmentation

According to British Standard 3263 (1960), water is charged in a bottle, which is then closed by the rubber closure and fastened by an aluminum cap. A part of the aluminum cap is removed for the ease of penetration by an injection needle and a standard test needle with an outer diameter of 0.72 mm (22 G made by TOP) is penetrated through it 10 times. Then, the bottle is shaken several times and the number of rubber fragments in the water is counted.

(3) Determination of Penetrability

According to British Standard 3263 (1960), the force of penetration is measured by the use of a Shimazu Autograph (commercial name, made by Shimazu Seisakujo KK) when a standard test needle with an outer diameter of 0.72 mm is passed through the central part of the rubber closure.

(4) Determination of Self-Sealability

Water is charged in a bottle of 500 ml, which is then closed by the rubber plug, fastened by an aluminum cap, heated at 121° C. for 30 minutes and cooled. A standard test needle is allowed to penetrate "OUT" part of the rubber closure and the bottle is allowed to stand in an inverted state for 1 hour. Then, an air needle is allowed to penetrate through it to let 400 ml of the water out of the bottle, the test needle is withdrawn and at the same time, the quantity of water flowing out is measured.

The results of the above described tests are shown in Table 8:

TABLE 8

| | Measured Value | Standard Value |
|---|---|---|
| Insoluble Particulate Matter Test | | |
| 10 μm (number) | 1 | 10 |
| 5 μm (number) | 46 | 100 |
| Determination of Fragmentation | no | 3 |
| Determination of Penetrability (g) | 460 | 1000 |
| Determination of Self-Sealability (ml) | 0.5 | |

It will be apparent from the results of the specificity test as shown in Table 8 that the rubber sample satisfied all the standard requirements and above all, showed better results in the insoluble particulate matter test than rubber plugs produced by the prior art processes.

EXAMPLES 5 to 8

Blending was carried out according to "Test Method of Rubber", page 108–118, i.e. ASTM standard method:

TABLE 9

| | Examples | | | |
|---|---|---|---|---|
| | 5 | 6 | 7 | 8 |
| Rubber | BIIR[1] | CSM[2] | GECO[3] | BIIR[1] |
| | 100 | 100 | 100 | 100 |
| HMWPE (Example 1) | 23 | 23 | 23 | 33 |
| Zinc Oxide | 1 | — | — | 1 |
| Magnesium Oxide | 0.3 | 10 | 5 | 0.3 |
| White Carbon | 8 | 8 | 8 | — |
| Silane Coupling Agent[4] | 0.5 | 0.5 | 2 | 0.5 |
| Sulfur | 0.3 | 0.8 | — | — |
| TMTD[5] | 0.2 | 0.8 | [6]1.0 | [7]0.6 |
| Curing (°C. × min) | 150 × 20 | 160 × 30 | 160 × 30 | 160 × 20 |

Note:
[1]POLYSAR BROMO BUTYL X-2 -commercial name-manufactured by Polysar Co., ML$_{1+4}$(125° C.) 53, Br = 1.9 wt %
[2]Hypalon -commercial name- manufactured by Du Pont, ML$_{1+4}$(100° C.) 55, Cl = 3.5% by weight
[3]Gechron 3100 -commercial name- manufactured by Nippon Zeon Co., epichlorohydrin-ethylene oxide-allylglycidyl ether ternary compolymer
[4]γ-Mercaptopropyltrimethoxysilane
[5]Tetramethylthiuram disulfide
[6]2,4,6-trimercapto-s-triazine
[7]1,1-di-(t-butylperoxy)-3,3,5-trimethylcyclohexane

TABLE 10

| Physical Properties of Vulcanizate | | | | |
|---|---|---|---|---|
| | Examples | | | |
| | 5 | 6 | 7 | 8 |
| Hardness (Hs) | 38 | 39 | 41 | 43 |
| Tensile Strength (kg/cm$^2$) | 106 | 132 | 112 | 86 |
| Elongation at Break (%) | 620 | 520 | 580 | 500 |
| Compression Set* (%) | 37 | 31 | 28 | 23 |

Note:
*press 25%, temp 70° C. × 22 hrs, etc. according to JIS K 6301

TABLE 11

| Extraction Test[1] | | | | | |
|---|---|---|---|---|---|
| | | Examples | | | |
| | | 5 | 6 | 7 | 8 |
| CH$_3$COOH 20% (90° C.× 30 min) | Residue on Evaporation (ppm) | 0.1 | 0.1 | 0.3 | 0.1 |
| | KMnO$_4$-Reducing Substance (ppm) | 0.3 | 0.2 | 0.5 | 0.3 |
| | UV Spectrum | 0.12 | 0.10 | 0.15 | 0.15 |
| C$_2$H$_5$OH 20% (90° C. × 30 min) | Residue on Evaporation (ppm) | 0.1 | 0.1 | 0.2 | 0.1 |
| | KMnO$_4$-Reducing Substances (ppm) | 0.2 | 0.2 | 0.4 | 0.2 |
| | UV Spectrum | 0.01 | 0.01 | 0.02 | 0.02 |

Note:
[1]According to the sanitation test method of rubber products of JIS T 9010 (1982)

As is evident from the results of Table 11, the rubber products of the present invention are suitable for rubber parts for the preparation of foods.

EXAMPLES 9 TO 10 AND COMPARATIVE EXAMPLES 5 TO 7

The procedure of blending the composition shown in Table 12 was carried out according to ASTM D 3403.

TABLE 12

| | Examples | | Comparative Examples | | |
|---|---|---|---|---|---|
| | 9 | 10 | 5 | 6 | 7 |
| IR (Nipol IR 2200)[1] | 100 | 100 | 100 | 100 | 100 |
| Stearic Acid | 0.3 | 0.3 | 0.3 | 0.3 | 0.3 |
| Zinc Oxide | 2 | 2 | 2 | 2 | 2 |
| Sulfur | 2 | 2 | 2 | 2 | 2 |
| TMTS[2] | 0.7 | 0.7 | 0.7 | 0.7 | 0.7 |
| HMWPE[3] | 30 | 15 | — | — | — |
| PE[4] | — | — | — | 15 | — |
| Dixie Clay | — | — | — | — | 30 |

Note:
[1]ML$_{1+4}$ (100° C.) 83, cis 98%
[2]Tetramethylthiuram Monosulfide
[3]Hizex Million 240M -commercial name- same as that of Example 1
[4]FLO-THENE UF -commercial name- same as that of Example 1

An ODR test was carried out in an analogous manner to Example 1 except that the temperature was adjusted to 170° C. The results obtained are shown in Table 13:

TABLE 13

| | ODR Test | | | | |
|---|---|---|---|---|---|
| | Examples | | Comparative Examples | | |
| | 9 | 10 | 5 | 6 | 7 |
| Torque (kg/cm) | | | | | |
| Initial (a) | 23.0 | 19.2 | 15.2 | 15.1 | 22.2 |
| Minimum (b) | 19.5 | 16.8 | 14.0 | 11.0 | 19.8 |
| Maximum (c) | 48.6 | 44.1 | 39.2 | 20.8 | 47.9 |
| (c)-(b) | 29.1 | 27.3 | 25.2 | 9.8 | 28.1 |
| Cure Time (minute) | | | | | |
| t'c (10) | 4.8 | 4.8 | 4.6 | 2.4 | 2.4 |
| t'c (90) | 22.9 | 23.0 | 22.8 | 20.4 | 82.0 |

TABLE 13-continued

| | ODR Test | | | | |
|---|---|---|---|---|---|
| | Examples | | Comparative Examples | | |
| | 9 | 10 | 5 | 6 | 7 |
| t'c(90)-t'c(10) | 18.1 | 18.2 | 18.2 | 18.0 | 79.6 |

Comparative Example 5 is a standard pure rubber compound. In Examples 9 and 10 wherein HMWPE is added thereto, the maximum torque and torque (c)−(b) are increased, which implies that extensive vulcanization networks are formed. In Comparative Example 6, wherein PE is added, however, the maximum torque and (c) −(b) are smaller, which implies little vulcanization. HMWPE hardly changes the curing time (t'c (90)), but Dixie Clay lengthens the curing time.

TABLE 14

| Physical Properties of Vulcanizates[1] | | | | | |
|---|---|---|---|---|---|
| | Examples | | Comparative Examples | | |
| | 9 | 10 | 5 | 6 | 7[3] |
| Hardness (Hs) | 46 | 41 | 35 | no[2] | 44 |
| 300% Modulus (kg/cm$^2$) | 32 | 59 | 25 | | 52 |
| Tensile Strength (kg/cm$^2$) | 141 | 136 | 127 | | 102 |
| Elongation at Break (%) | 600 | 520 | 720 | | 620 |
| Tear Resistance (kg/cm) | 25.3 | 28.2 | 24.5 | | 36.2 |

Note:
[1]vulcanization condition 160° C. × 40 minutes
[2]No vulcanization test sample was formed.
[3]vulcanization condition 180° C. × 40 minute In Comparative Example 6, PE was too soft to obtain a vulcanization test piece for the measurement of physical properties. That is, this comparative example shows that PE hinders the vulcanization. Examples 9 and 10 show that the hardness, modulus, tensile strength and tear resistance are improved. In Comparative Example 7, Dixie Clay retards the vulcanization to such a large extent that a test piece capable of measuring the physical properties can only be obtained by raising the vulcanization temperature: but the physical properties of the vulcanizate, however, are relatively excellent.

TABLE 15

| Hygienic Test[1] | | | | | |
|---|---|---|---|---|---|
| | Examples | | Comparative Examples | | |
| | 9 | 10 | 5 | 6 | 7 |
| Material Test | | | | | |
| Pb (ppm) | 0.05 | 0.05 | 0.05 | no[2] | 2.8 |
| Cd (ppm) | 0.01 | 0.01 | 0.01 | | 0.1 |
| Extraction Test[3] | | | | | |
| Residue on Evaporation (ppm) | 0.8 | 0.8 | 0.8 | | 1.5 |
| KMnO$_4$-Reducing Substance (ppm) | 1.0 | 1.0 | 1.8 | | 2.8 |
| Pb (ppm) | 0.01 | 0.01 | 0.01 | | 0.5 |
| As (ppm) | 0.01 | 0.01 | 0.01 | | 0.1 |
| Zn (ppm) | 0.1 | 0.1 | 0.1 | | 0.5 |
| Formaldehyde | ND[4] | ND | ND | | ND |
| Phenol | ND[4] | ND | ND | | ND |
| UV Spectrum | 0.08 | 0.10 | 0.10 | | 0.28 |

Note:
[1]according to JIS T 9010
[2]No rubber test piece was obtained.
[3]extracted with water at 120° C. for 30 minutes
[4]no detection In the material test, Comparative Example 7 shows the presence of considerable amounts of heavy metals such as Pb and Cd from the fillers and zinc oxide, but Examples 9 and 10 show only the presence of Pb and Cd in trace amounts. In Comparative Example 7, heavy metals such as Pb and Zn are also found in the extracted solution. This implies that the rubber product of Comparative Example 7 is unhygienic.

EXAMPLES 11 TO 17 AND COMPARATIVE EXAMPLES 8 AND 9

Blending of the composition shown in Table 16 was carried out according to ASTM D 3484-76.

TABLE 16

| | Examples | | | | | | | Comparative Examples | |
|---|---|---|---|---|---|---|---|---|---|
| | 11 | 12 | 13 | 14 | 15 | 16 | 17 | 8 | 9 |
| BR[1] | 100 | 100 | 85 | 100 | 100 | 100 | 100 | 100 | 100 |
| SBR[2] | — | — | 15 | — | — | — | — | — | — |
| HMWPE[3] | 15 | 9 | 15 | 10 | 15 | 15 | 3 | — | — |
| PE[4] | — | 6 | — | — | — | — | — | 6 | 15 |
| Filler[5] | — | — | — | 5 | 2 | — | 15 | 15 | — |
| Organo Peroxide[6] | 0.25 | 0.25 | 0.25 | 0.25 | 0.25 | 0.25 | 0.25 | 0.25 | 0.25 |
| Other Vulcanizing Agent | — | — | — | — | — | 1.0[7] | — | 1.0 | — |
| Silane Coupling agent[8] | — | — | — | — | 1 | — | 0.5 | — | — |

Note:
[1]BRO1 -commercial name- manufactured by JSR, ML$_{1+4}$(100° C.) 44, quantity of cis 96%
[2]SL 552 -commercial name- manufactured by JSR, ML$_{1+4}$(100° C.) 55, bonded styrene 24%, cis 1,4 content 20%
[3]Hifax -commercial name- manufactured by Hercules Powder Co., mean molecular weight 300 × 10$^4$ (by viscosity method)
[4]Shorex -commercial name- manufactured by Showa Denko KK, low density PE, melting point 92° C.
[5]Whitex -commercial name- manufactured by Southern Clay
[6]1,1-di-(t-butylperoxy)-3,3,5-trimethylcyclo-hexane
[7]1,2-polybutadiene
[8]Vinyltrimethoxysilane An ODR test was carried out in an analogous manner to Example 1 except that the temperature was adjusted to 155° C. The results obtained are shown in Table 17:

TABLE 17

| | ODR Test | | | | | | | | |
|---|---|---|---|---|---|---|---|---|---|
| | Examples | | | | | | | Comparative Examples | |
| | 11 | 12 | 13 | 14 | 15 | 16 | 17 | 8 | 9 |
| Torque | | | | | | | | | |

TABLE 17-continued

ODR Test

|  | Examples | | | | | | | Comparative Examples | |
|---|---|---|---|---|---|---|---|---|---|
|  | 11 | 12 | 13 | 14 | 15 | 16 | 17 | 8 | 9 |
| (kg/cm$^2$) | | | | | | | | | |
| Initial (a) | 21.5 | 19.5 | 21.6 | 19.8 | 21.2 | 20.5 | 19.8 | 19.5 | 20.0 |
| Minimum (b) | 20.4 | 18.1 | 19.5 | 18.4 | 19.1 | 18.5 | 18.5 | 14.2 | 15.0 |
| Maximum (c) | 50.4 | 51.7 | 50.0 | 56.4 | 54.3 | 55.7 | 51.8 | 44.0 | 42.2 |
| (c)−(b) | 30.0 | 33.6 | 30.5 | 38.0 | 35.2 | 37.2 | 33.3 | 29.8 | 27.2 |
| Cure Time (minute) | | | | | | | | | |
| t'c (10) | 1.7 | 1.5 | 1.0 | 1.4 | 1.5 | 1.3 | 1.5 | 1.4 | 1.5 |
| t'c (90) | 8.9 | 8.0 | 7.4 | 7.9 | 7.8 | 7.7 | 8.2 | 7.4 | 7.9 |
| t'c(90)−t'c(10) | 7.2 | 6.5 | 6.0 | 6.5 | 6.3 | 6.4 | 6.7 | 6.0 | 6.4 |

It is apparent from the results of Table 17 that in comparison of Example 11 and Comparative Example 9, the former is more excellent in respect of the maximum torque and (c)−(b), which shows the difference between HMWPE and PE. Furthermore, the use of PE (Example 12), filler (Example 14) and silane coupling agent (Example 15) with EMWPE results in increase of the torque value (c) −(b). Even when a part of BR is replaced by SBR (Example 13), similar results are obtained to the case when only BR is used.

TABLE 18

Physical Properties of Vulcanizates[1]

|  | Examples | | | | | | | Comparative Examples | |
|---|---|---|---|---|---|---|---|---|---|
|  | 11 | 12 | 13 | 14 | 15 | 16 | 17 | 8 | 9 |
| Hardness (Hs) | 43 | 45 | 44 | 48 | 44 | 46 | 43 | 43 | 40 |
| 200% Modulus (kg/cm$^2$) | 18 | 20 | 15 | 23 | 21 | 24 | 19 | 12 | 10 |
| 300% Modulus (kg/cm$^2$) | 29 | 31 | 25 | 33 | 31 | 35 | 30 | 23 | 21 |
| Tensile Strength(kg/cm$^2$) | 58 | 60 | 50 | 60 | 58 | 58 | 58 | 43 | 42 |
| Elongation at Break (%) | 435 | 430 | 400 | 410 | 425 | 400 | 430 | 390 | 380 |
| Tear Resistance (kg/cm) | 15.9 | 16.3 | 14.9 | 16.5 | 16.5 | 16.0 | 16.0 | 11.5 | 10.2 |

Note:
[1]at 140° C. for 25 minutes

In comparison of Example 11 with Comparative Example 9, it can clearly be appreciated that HMWPE gives a larger modulus, tensile strength and tear resistance than PE. Other Properties are substantially similar to those of the ODR test as shown in Table 17. That is, the joint use of PE (Example 12) or filler (Example 14) with HMWPE results in raising the bridging efficiency.

TABLE 19

Hygienic Test[1]

|  | Examples | | | | | | | Comparative Examples | |
|---|---|---|---|---|---|---|---|---|---|
|  | 11 | 12 | 13 | 14 | 15 | 16 | 17 | 8 | 9 |
| Residue on Evaporation (ppm) | 0.1 | 0.1 | 0.1 | 0.1 | 0.1 | 0.1 | 0.1 | 0.5 | 0.5 |
| KMnO$_4$-Reducing Substance (ppm) | 0.3 | 0.3 | 0.3 | 0.3 | 0.3 | 0.3 | 0.3 | 0.5 | 0.5 |
| UV Spectrum | 0.02 | 0.02 | 0.02 | 0.02 | 0.02 | 0.02 | 0.02 | 0.05 | 0.05 |

Note:
[1]extracted at 90° C. for 30 minutes according to JIS T 9010 (1982)

As is evident from the test results of Table 19, the rubber products of the present invention are satisfactory in their hygienic properties.

EXAMPLE 18 AND COMPARATIVE EXAMPLE 10

The composition of Table 20 was blended and subjected to tests in an analogous manner to Example 11.

TABLE 20

|  | Example 18 | |
|---|---|---|
| BR (BRO2[1]) | 92 parts | |
| EPDM (EP 25[2]) | 8 | |
| White Carbon | 3 | 3 |
| Zinc Oxide | 1 | 1 |
| HMWPE (similar to Example 1) | 14 | 14 |
| PE (Shorex M222[3]) | 1 | 1 |
| 2,5-dimethyl-2,5-di-(t-butylperoxy)-hexyne-3 | 0.6 | 0.6 |

Note:
[1]commercial name, manufactured by JSR, ML$_{1+4}$ (100° C.) 44, cis 94%
[2]commercial name, manufactured by JSR, ML$_{1+4}$ (100° C.) 90, iodine number higher
[3]commercial name, manufactured by Showa Denko KK low denslt PE

TABLE 21

Physical Properties of Vulcanizates[1]

| Hardness (Hs) | 41 |
|---|---|
| 300% Modulus (kg/cm$^2$) | 27 |
| Tensile Strength (kg/cm$^2$) | 87 |
| Elongation at Break (%) | 530 |

Note:
[1]curing at 160° C. for 40 minutes

TABLE 22

Material Test

| Cd (ppm) | 0.01 | Atomic Absorptiometric Analysis | 5 |
|---|---|---|---|
| Pb (ppm) | 0.05 | Atomic Absorptiometric Analysis | 5 |

The rubber sample was extracted with an amount of water 10 times the weight of the rubber at 121° C. for 60 minutes according to the test method of rubber closures for aqueous infusions as specified in The Pharmacopoeia of Japan 41. The test results of the extracted liquid and the standard values of The Pharmacopoeia of Japan are shown in Table 23:

TABLE 23

| Extraction Test | | |
|---|---|---|
| | Measured Value | Standard Value |
| Description (%) | 99.5 | 99.0 |
| Foam Test (min) | 2 | 3 |
| pH | 0.6 | ±1.0 |
| Zinc (μg/ml) | 0.01 | 0.5 |
| $KMnO_4$-reducing Substance (ml) | 0.8 | 2.0 |
| Residue on Evaporation (mg) | 0.3 | 2.0 |
| UV Absorption Spectrum | 0.07 | 0.2 |

A specificity test was carried out in an analgous manner to that of Example 4. The results obtained are shown in Table 24:

TABLE 24

| | Measured Value | Standard Value |
|---|---|---|
| Particulate Matter Test | | |
| 10 μm (number) | 1 | 10 |
| 5 μm (number) | 26 | 100 |
| Fragmentation | no | 3 |
| Penetrability | 530 | 1000 |
| Self-Sealability (ml) | no | |

The rubber closure of the present invention is available for injection of grape sugar, amino acids and electrolyte drugs.

TABLE 25

| | Example 18 | Comparative Example 10 |
|---|---|---|
| Rubber | 92 parts[1] | 92 parts[2] |
| EPDM[3] | 8 | 8 |
| White Carbon | 3 | 3 |
| Zinc Oxide | 1 | 1 |
| HMWPE[4] | 14 | 14 |
| PE[5] | 1 | 1 |
| 2,5-dimethyl-2,5-di-t-butylperoxy)-hexyne-3 | 0.6 | 0.6 |

Note:
[1]BR: JSR BRO2 -commercial name- manufactured by JSR, $ML_{1+4}$ (100° C.) 44, cis 94%
[2]SBR: JSR 1502 -commercial name- manufactured by JSR, $ML_{1+4}$ (100° C.) 52, styrene 23.5% (by cold emulsion polymerization method)
[3]EPDM: JSR EP 25 -commercial name- manufactured by JSR, $ML_{1+4}$ (100° C.) 90 iodine number higher
[4]HMW: same as in Example 1
[5]PE: Shorex M 222 -commercial name- manufactured by Showa Denko KK, low density PE

TABLE 26

| Physical Properties of Vulcanizates[1] | | |
|---|---|---|
| | Example 18 | Comparative Example 10 |
| Hardness (Hs) | 41 | 43 |
| 300% Modulus (kg/cm²) | 27 | 25 |
| Tensile Strength (kg/cm²) | 87 | 73 |
| Elongation at Break (%) | 530 | 480 |

Note:
[1]curing at 160° C. for 40 minutes

TABLE 27

| Material Test | | |
|---|---|---|
| | Example 18 | Comparative Example 10 |
| Cd (ppm) | 0.01 | 0.1 |
| Pb (ppm) | 0.05 | 0.5 |

The rubber sample was extracted with an amount of water 10 times the weight of the rubber at 121° C. for 60 minutes according to the test method of rubber closures for aqueous infusions as specified in The Pharmacopoeia of Japan 41. The test results of the extracted liquid and the standard values of The Pharmacopoeia of Japan are shown in Table 28:

TABLE 28

| Extraction Test | | |
|---|---|---|
| | Example 18 | Comparative Example 10 |
| Description (%) | 99.5 | 98 |
| Foam Test (min) | 2 | 4 |
| pH | +0.6 | +1.3 |
| Zinc (μg/ml) | 0.01 | 0.1 |
| $KMnO_4$-reducing Substance (ml) | 0.8 | 1.5 |
| Residue on Evaporation (mg) | 0.3 | 1.8 |
| UV Absorption Spectrum | 0.07 | 0.17 |

TABLE 29

| Specificity Test | | |
|---|---|---|
| | Example 18 | Comparative Example 10 |
| Particulate Matter Test | | |
| 10 μm (number) | 1 | 23 |
| 5 μm (number) | 26 | 320 |
| Fragmentation | no | 1 |
| Penetrability | 530 | 420 |
| Self-Sealability (ml) | no | 5 |

The results of Example 18 imply that the rubber closure of the present invention is available for injection of grape sugar, amino acids, electrolyte drugs, etc. and the result of Comparative Example 10 does not satisfy the requirements in the test of rubber closures for aqueous infusions and the specificity test.

I claim:

1. A sanitary article consisting of a rubber composition consisting essentially of a synthetic rubber and a fine powder of polyethylene with a mean molecular weight of $1 \times 10^6$ to $1 \times 10^9$, wherein the fine powder of polyethylene is in a proportion of 3 to 43 parts by weight to 100 parts by weight of the synthetic rubber, and has a particle size of 1 to 74 microns, and the synthetic rubber and fine powder of polyethylene are blended, bridged and shaped and wherein the synthetic rubber, obtained by solution polymerization, is at least one member selected from the group consisting of isobutylene-isoprene rubber, chlorinated isobutylene-isoprene rubber, brominated isobutylene-isoprene rubber, isobutylene-divinylbenzene copolymer, ethylene-propylene rubber, ethylene-propylenediene rubber, chlorosulfonated polyethylene, epichlorohydrin rubber, isoprene rubber, styrene-butadiene rubber, isoprene-styrene rubber, ethylene-vinyl acetate copolymer and thermoplastic rubbers of styrene-butadiene or styrene-isoprene.

* * * * *

UNITED STATES PATENT AND TRADEMARK OFFICE
CERTIFICATE OF CORRECTION

PATENT NO.   :   4,833,206

DATED        :   May 23, 1989

INVENTOR(S)  :   Masao TAJIMA

It is certified that error appears in the above-identified patent and that said Letters Patent is hereby corrected as shown below:

```
COLUMN 14, LINE 59:
Claim 1, line 14, change "isobutylene-divinylbenzene" to
                  --isobutylene-isoprene-divinylbenzene--.
```

Signed and Sealed this

Third Day of December, 1991

Attest:

HARRY F. MANBECK, JR.

*Attesting Officer*      *Commissioner of Patents and Trademarks*